Patented July 30, 1929.

1,722,677

UNITED STATES PATENT OFFICE.

CURTIS J. PATTERSON, OF KANSAS CITY, AND CHASTAIN G. HARREL, OF LIBERTY, MISSOURI, ASSIGNORS, BY MESNE ASSIGNMENTS, TO BAKERIES SERVICE CORPORATION, A CORPORATION OF DELAWARE.

BREAD MAKING.

No Drawing.   Application filed March 13, 1922. Serial No. 543,515.

This invention pertains particularly to that part of the process of producing bread or other bread products containing wheat products that occurs before the dough is divided preparatory to being baked.

An object of the invention is the production of a baked product that shall be uniform irrespective of the characteristics of the flour or of the wheat from which the flour is derived.

Another object of the invention is to shorten materially the period required for bringing the dough to the condition it should have by the time it is divided preparatory to the treatment through which it goes before being panned. This object is attained by rendering unnecessary, and avoiding, the period of mass fermentation to which the dough ordinarily is subjected immediately after the ingredients thereof are mixed.

In the manufacture of bread as now performed, after the ingredients are mixed and formed into dough, the dough is allowed to stand in a place maintained preferably at uniform temperature and humidity, for a period, known as the "dough period", of from one to eight hours, the length of time required for bringing the dough to proper condition being dependent upon certain variable characteristics.

This step in the making of bread is to produce, through fermentation, acid to condition the gluten to the physical characteristics of elasticity and plasticity required for production of a satisfactory product. It is necessary that there shall be present in the dough sufficient acid, in excess of that required to counteract the buffer action in the dough due to the mineral constituents thereof, to condition the gluten. It is not until the buffer action caused by the mineral constituents, or otherwise, is counteracted, that the gluten can have acid to absorb. The amount of such mineral constituents determine what is known as the "buffer value". Flours do not often agree in buffer value. The buffer value of flours, and certain other characteristics, being variable, it follows that flours require in the dough, with methods as previously performed, varying periods for attaining the presence therein of the total amount of acid necessary to condition the gluten.

In carrying out the process of this invention, there is mixed, with the other ingredients of the dough, that quantity of a suitable acid that is required, in excess of the available or free acid already present, to bring the gluten to the optimum condition by the time the mixing operation as ordinarily performed is completed, whereby the necessity of subjecting the dough, before dividing, to the usual period of mass fermentation for production of acid therein is avoided and the dough may pass directly from the mixers to the dividers.

The optimum—that is, the average or most desirable—conditioning stage of dough is preferable. When a gluten is at the so-called optimum condition, it has the best elastic and plastic properties for the greatest gas retention and for the making of the best bakery products.

The amount of a particular acid required to be added to the mixture for a given flour or blend of flours is determined by calculations from a factor that is dependent upon the characteristics thereof, these calculations being by methods well known to the chemist. This factor is obtained, preferably and most accurately, by subjecting a sample of the flour or blend of flours, or of the wheat or wheaten from which they are to be derived, to measurement by the potentiometric method of determining the hydrogen ion concentration, which measurement will show the inherent or available or free acidity and other characteristics. Although the hydrogen ion concentration is, perhaps, the only method now available for accurate determination of acidity, it is to be understood that it is not the intention to limit the practice of this invention solely to that method, as other methods of such determination equally satisfactory later may be developed.

The hydrogen ion concentration has been found to be very uniform in the manufacture of bread; in other words, where a dough is allowed, or is controlled properly, to reach a given or constant of hydrogen ion concentration, it is found that this dough will produce, with other plant conditions being held constant, a uniform bread. The same result is attained in the practice of the process of this invention, wherein the initial fermentation or dough period is eliminated, because the proper hydrogen ion concentration is effected by the time of completion of the mixing operation, by which time the dough is in substantially the same condition as after it undergoes the usual fermentation period without addition of the amount of acid determined to be necessary for the gluten-conditioning purpose.

Any of several non-toxic substances may be added to the mixture for that purpose, such as, for example, tartaric acid, lactic acid and citric acid.

The acid, in the quantity determined to be required, preferably is introduced into the mixer concurrently with, or at about the time of the introduction of, the other ingredients of the dough. One suitable and convenient method is to introduce it in solution in the water ingredient.

In determining the quantity of acid to be added, a specimen of the flour to be used, or of the wheat or wheaten material from which the flour is to be derived, is subjected to scientific analysis by the hydrogen ion concentration method. Thus, if there is ascertained a hydrogen ion concentration of, for example, $.116 \times 10-5$ for the flour and $.274 \times 10-5$ for the dough, then by subtraction of .00000116 from .00000274 there is obtained the factor .00000158 for calculating, by methods well known to the chemist, the amount of acid required per unit of that flour. In the case of tartaric acid, for example, the calculations from that factor would indicate that from .05 to 0.1 of a gram is required per pound of flour.

Quantities of acid to be added, as hereinbefore referred to, are based on the supposition that the mixing operation will be completed in about 15 minutes. The factor of computation and thus the exact quantities of acid are subject to tolerances to meet conditions and characteristics of materials and conditions of manufacture more or less variable.

As dough treated in a mixer in a manner such as described can go directly therefrom to the dividers and thence to other machines and through the proof period, instead of remaining for fermentation in troughs for from one to eight hours, not only is there a shortening of the time required for production of the product from commencement of mixing to removal from the ovens, but there are also other advantageous results.

The fermentation period requires that the dough shall remain in troughs in a place kept at uniform temperature and humidity and a refrigeration plant is required to maintain those conditions. This process renders such installations and the incident expense of maintenance, material and labor unnecessary.

Further, there is a saving of about one and one-half per cent in the weight of the dough, as there is a loss of approximately that much during the usual fermentation period due to evaporation and to consumption of carbohydrates.

Moreover, by the practice of the process of this invention, it is practicable to use 100 per cent flour and to produce therefrom bread of increased food value and in quality equal to that produced from short patent flours.

This invention also comprehends production, in advance of its mixing with other materials in the formation of dough, of a dough ingredient containing the quantity of gluten-conditioning substance required to attain optimum condition of the gluten of the flour in the dough during the usual mixing operation to form dough.

Thus, for example, the characteristics of a flour or blend of flours are ascertained, by methods such as hereinbefore described, and the gluten-conditioning acid or other substance is mixed in dry form with the flour or blend in the quantity found to be required. Tartaric acid, for example, is one of the substances that can be preassociated with flour.

As there are available gluten-conditioning substances that remain inactive until brought into the presence of moisture, flour containing such substance may be produced, stored, shipped and kept until it is required for the formation of dough.

When such flour is introduced with water and other materials into a mixer for formation of dough, the added gluten-conditioning substance of the flour will act substantially as hereinbefore described to bring the gluten to optimum condition by the end of the ordinary period of mixing. Accordingly, flour thus prepared may be furnished bakers, who with it can proceed with the manufacture of bread and other gluten-containing bakery products without subjecting the dough to the usual period of mass fermentation prior to the dividing operation.

While flour is cited as an example of the dough material with which a gluten-conditioning substance may be preassociated, it is to be understood that such a substance, in the quantity predetermined to be needed to satisfy the requirements of an amount of flour entering into a dough-batch, may also be incorporated into some other dough material; as, for example, into starch when starch is to be added to the dough-batch.

Having thus described our invention, what we claim as new, and desire to secure by Letters Patent, is—

1. In a process of bread making, that step that consists of incorporating with a dough ingredient the quantity of non-toxic organic acid predetermined to be required, in excess of similarly-acting substances inherent in the flour used, to bring the gluten of that flour to optimum condition during the mixing period of dough formation.

2. In a process of bread making, that step that consists of mixing with flour the quantity of non-toxic organic acid predetermined to be required, in excess of the available acid inherent in the flour, to bring the gluten of that flour to optimum condition during the period of mixing that flour with other ingredients in the formation of dough.

3. A process that includes determination of the quantity of non-toxic organic acid required, in excess of similarly-acting substances inherent in a flour, to bring the gluten of that flour to optimum condition during the formation of dough from that flour and other ingredients, and association of that quantity of acid with the flour.

4. Flour containing the quantity of non-toxic organic acid required, in excess of similarly-acting substances inherent in the flour, to bring the gluten of the flour to optimum condition during the formation of dough with that flour.

5. In bread making, the incorporation into a dough batch containing flour of a gluten-maturing agent sufficient in quantity to mature the gluten of the flour during the mixing period of dough formation.

6. In a process of bread making, the step that consists of incorporating with a dough ingredient the quantity of gluten-maturing agent required to mature the gluten of the flour used during the mixing period of dough formation.

7. Flour containing the quantity of gluten-maturing agent required, in excess of similarly-acting substances inherent in the flour, to mature the gluten of the flour during the formation of dough with that flour.

8. The method of making leavened bread which comprises bringing into admixture with flour, yeast, and other ingredients of the dough batch a gluten-maturing agent sufficient in quantity to effect substantially complete maturing of all the gluten of the flour, and fermenting the batch, substantially as and for the purpose described.

9. As a composition of matter, flour in admixture with a gluten-maturing agent in quantity sufficient to effect substantially complete maturing of the gluten of the flour, when such agent is dissolved in the amount of water necessary for making a dough batch with such flour.

10. Dough material containing the quantity of non-toxic organic acid required, in excess of similarly-acting substances in flour of a dough batch into which said material is to enter as an ingredient, to bring said flour of predetermined quantity and characteristics in the batch to optimum condition during the mixing period of dough formation.

11. Dough material containing the quantity of gluten-maturing agent required, in excess of similarly-acting substances inherent in flour of the dough batch into which said material is to enter as an ingredient, to mature the gluten of said flour of predetermined quantity and characteristics in the batch during the mixing period of dough formation.

12. Dough material containing the quantity of non-toxic organic acid required, in excess of similarly-acting substances inherent in said material and present in other ingredients in a dough batch, to bring flour of predetermined quantity and characteristics in the batch to optimum condition during the mixing period of dough formation.

13. Dough material containing the quantity of gluten-maturing agent required, in excess of similarly-acting substances inherent in said material and present in other ingredients in a dough batch, to bring flour of predetermined quantity and characteristics in the batch to optimum condition during the mixing period of dough formation.

In witness whereof we affix our signatures.

CURTIS J. PATTERSON.
CHASTAIN G. HARREL.